(12) United States Patent
Tadano

(10) Patent No.: US 9,236,606 B2
(45) Date of Patent: Jan. 12, 2016

(54) ELECTRODE WITH POROUS PROTECTIVE FILM, NONAQUEOUS ELECTROLYTE SECONDARY BATTERY, AND METHOD FOR MANUFACTURING ELECTRODE WITH POROUS PROTECTIVE FILM

(75) Inventor: Junichi Tadano, Fukushima (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 12/481,289

(22) Filed: Jun. 9, 2009

(65) Prior Publication Data

US 2009/0311598 A1 Dec. 17, 2009

(30) Foreign Application Priority Data

Jun. 11, 2008 (JP) ................... 2008-152469

(51) Int. Cl.
*H01M 6/14* (2006.01)
*H01M 4/139* (2010.01)
*H01M 4/13* (2010.01)
*H01M 4/62* (2006.01)
*H01M 10/05* (2010.01)

(52) U.S. Cl.
CPC .............. *H01M 4/139* (2013.01); *H01M 4/13* (2013.01); *H01M 4/62* (2013.01); *H01M 4/622* (2013.01); *H01M 10/05* (2013.01); *Y02E 60/122* (2013.01); *Y10T 29/49115* (2015.01)

(58) Field of Classification Search
USPC .................................. 429/188, 215; 349/122
See application file for complete search history.

(56) References Cited

U.S. PATENT DOCUMENTS

| 5,656,391 | A | | 8/1997 | Hambitzer et al. |
| 5,869,208 | A | | 2/1999 | Miyasaka |
| 5,882,723 | A | * | 3/1999 | Tsou .............................. 427/125 |
| 6,335,114 | B1 | * | 1/2002 | Ueshima et al. ................ 429/94 |
| 6,365,299 | B1 | | 4/2002 | Miyaki et al. |
| 2004/0016646 | A1 | * | 1/2004 | Stucky et al. ................. 205/111 |

(Continued)

FOREIGN PATENT DOCUMENTS

| JP | 2003-077465 | 4/1991 |
| JP | 2003-132875 | 6/1991 |

(Continued)

OTHER PUBLICATIONS

Japanese Office Action issued on Nov. 9, 2010, for corresponding Japanese Patent Appln. No. 2008-152469.

(Continued)

*Primary Examiner* — Melvin C Mayes
*Assistant Examiner* — Colette Nguyen
(74) *Attorney, Agent, or Firm* — K&L Gates LLP

(57) ABSTRACT

An electrode with a porous protective film includes an electrode in which an active material layer is disposed on a collector and a porous protective film which is disposed on a surface of the active material layer and which contains fine particles, a binder, a surfactant, and a thickener. A nonaqueous electrolyte secondary battery includes a negative electrode in which a negative electrode active material layer is disposed on a negative electrode collector, a positive electrode in which a positive electrode active material layer is disposed on a positive electrode collector, a nonaqueous electrolyte, a separator, and a porous protective film which is disposed on at least one of a surface of the negative electrode active material layer or a surface of the positive electrode active material layer and which contains fine particles, a binder, a surfactant, and a thickener.

15 Claims, 4 Drawing Sheets

(56) References Cited

U.S. PATENT DOCUMENTS

| | | | |
|---|---|---|---|
| 2006/0194116 A1 | 8/2006 | Suzuki et al. | |
| 2006/0232735 A1* | 10/2006 | Hokazono et al. | 349/122 |
| 2007/0196737 A1 | 8/2007 | Ohata et al. | |
| 2007/0201187 A1* | 8/2007 | McGregor et al. | 361/503 |
| 2008/0008932 A1* | 1/2008 | Kasamatsu | 429/144 |
| 2008/0199773 A1* | 8/2008 | Deguchi et al. | 429/188 |
| 2009/0197183 A1* | 8/2009 | Kato | 429/319 |

FOREIGN PATENT DOCUMENTS

| | | |
|---|---|---|
| JP | 2003-142076 | 6/1991 |
| JP | 2004-311237 | 11/1992 |
| JP | HEI 05-290839 | 11/1993 |
| JP | 2006-048942 | 2/1994 |
| JP | 2006-222077 | 8/1994 |
| JP | HEI 08-504052 | 4/1996 |
| JP | 2008-123996 | 5/1996 |
| JP | HEI 09-147835 | 6/1997 |
| JP | HEI 09-147856 | 6/1997 |
| JP | HEI 09-147916 | 6/1997 |
| JP | HEI 09-223449 | 8/1997 |
| JP | HEI 09-223499 | 8/1997 |
| JP | HEI 09-245836 | 9/1997 |
| JP | 3371301 | 11/2002 |
| JP | 2003-077465 | 3/2003 |
| JP | 2003-132875 | 5/2003 |
| JP | 2003-142076 | 5/2003 |
| JP | 2004-311237 | 11/2004 |
| JP | 2006-048942 | 2/2006 |
| JP | 2006-222077 | 8/2006 |
| JP | 2008-123996 | 5/2008 |
| WO | 97/01870 | 1/1997 |
| WO | 97-01870 | 1/1997 |
| WO | 2005-011043 | 2/2005 |
| WO | 2005/011043 A1 | 2/2005 |
| WO | 2005/029614 | 3/2005 |

OTHER PUBLICATIONS

Japanese Office Action issued on Dec. 20, 2011, for corresponding Japanese Patent Appln. No. 2008-152469.

Japanese Office Action issued on Nov. 6, 2012 for corresponding Japanese Patent Appln. No. 2008-152469.

* cited by examiner

ELECTRODE WITH POROUS PROTECTIVE FILM, NONAQUEOUS ELECTROLYTE SECONDARY BATTERY, AND METHOD FOR MANUFACTURING ELECTRODE WITH POROUS PROTECTIVE FILM

CROSS REFERENCES TO RELATED APPLICATIONS

The present application claims priority to Japanese Priority Patent Application JP 2008-152469 filed in the Japan Patent Office on Jun. 11, 2008, the entire content of which is hereby incorporated by reference.

BACKGROUND

The present application relates to an electrode with a porous protective film, a nonaqueous electrolyte secondary battery, and a method for manufacturing an electrode with a porous protective film. In particular, the present application relates to an electrode with a porous protective film, the electrode including an electrode, in which an active material layer is disposed on a collector, and a porous protective film, which is disposed on a surface of the active material layer and which contains fine particles, a binder, a surfactant, and a thickener, a nonaqueous electrolyte secondary battery, and a method for manufacturing an electrode with a porous protective film.

In recent years, enhancement of performance, miniaturization, and enhancement of portability of electronic equipment have progressed because of the advance of electronic technology. Consequently, requirements for increases in the energy densities of batteries used for such electronic equipment have become intensified.

As for secondary batteries used for such electronic equipment in the related art, aqueous electrolytic solution secondary batteries, e.g., nickel-cadmium batteries and lead batteries, have been used.

These secondary batteries exhibit low discharge voltages and, therefore, are unsatisfactory from the viewpoint of production of secondary batteries having high energy densities.

Hence, research and development on nonaqueous electrolytic solution secondary batteries as an alternative to the nickel-cadmium batteries and the like have been conducted recently.

Examples of the above-described nonaqueous electrolytic solution secondary batteries include a secondary battery in which a carbon material is used as a negative electrode active material, a lithium cobalt composite oxide is used as a positive electrode active material, and a nonaqueous electrolytic solution is prepared by dissolving a lithium salt into a nonaqueous solvent.

This secondary battery has advantages that the battery voltage is high and self discharge is at a low level, and thereby, a high energy density can be realized. In the case where the above-described carbon material and the lithium cobalt composite oxide are actually used as active materials, they are made into powders having average particle diameters of 5 to 50 µm, and the powders are dispersed into solvents together with binders, so as to prepare each of a negative electrode mix slurry and a positive electrode mix slurry. Subsequently, the individual slurries are applied to metal foil serving as respective collectors, so as to form a negative electrode active material layer and a positive electrode active material layer. A negative electrode and a positive electrode prepared by forming the negative electrode active material layer and the positive electrode active material layer, respectively, on the collectors are separated with a separator therebetween, and they are held in a battery can while being in that state.

Here, regarding the above-described nonaqueous electrolytic solution secondary battery, it should be noted that the electrical conductivity of a nonaqueous electrolytic solution used therefor is about two orders of magnitude smaller than the electrical conductivity of an aqueous electrolytic solution.

Therefore, it is desirable that the structure of the battery is made optimum for movement of an electrolyte.

Consequently, in the above-described nonaqueous electrolytic solution secondary battery, a very thin separator having a thickness of about 10 to 50 µm is used as a separator for separating the positive electrode and the negative electrode.

As described above, regarding the nonaqueous electrolytic solution secondary battery, an electrode is produced by applying a mix slurry containing an active material powder to a collector so as to form an active material layer and, thereafter, is held into a battery can.

At this time, the electrode provided with the active material layer passes through various steps, e.g., a step of laminating the electrode and a separator and a cutting step to cut into a predetermined electrode shape, until the electrode is held into the battery can.

However, during running of a raw electrode band in the lamination step and the cutting step, an inconvenience occurs in that the active material is dropped from the active material layer because of contact of the active material layer with a guide roller and the like and a part of the dropped active material adheres again to a surface of the electrode. Furthermore, in the step of holding the electrode into the battery can, an inconvenience occurs in that fine metal particles intrude into the battery. Moreover, the dropped active material, which adheres to the electrode surface again, and the fine metal particles intruded into the battery have particle diameters of 5 to 200 µm which are larger than or equal to the thickness of the separator. Consequently, a problem occurs in that they penetrate the separator in an assembled battery and cause physical internal short-circuit.

Accordingly, Japanese Unexamined Patent Application Publication No. 7-220759 proposes disposition of a porous protective film produced by applying a fine particle slurry containing a binder and fine particles to a surface of any one of the negative electrode active material layer and the positive electrode active material layer and conducting drying.

In addition, the air permeability of this porous protective film is selected so as to become about 680 sec/100 ml in the related art.

SUMMARY

However, the safety and the cycle characteristic of the nonaqueous electrolytic solution secondary battery described in Japanese Unexamined Patent Application Publication No. 7-220759 are unsatisfactory.

The present application addresses the above-identified, and other problems associated with the technology in the related art. It is desirable to provide an electrode with a porous protective film, a nonaqueous electrolyte secondary battery, and a method for manufacturing an electrode with a porous protective film, wherein excellent safety and an excellent discharge capacity maintenance factor are realized.

The present inventors conducted research to address the above-identified, and other problems in the related art. As a result, the present inventors have recognized that, for example, a porous protective film is formed on a surface of an electrode by using a porous protective film-forming slurry containing fine particles, a binder, a surfactant, and a thickener in accordance with an embodiment of the present application.

An electrode with a porous protective film, according to an embodiment, includes an electrode in which an active material layer is disposed on a collector and a porous protective film which is disposed on a surface of the above-described active material layer and which contains fine particles, a binder, a surfactant, and a thickener.

A nonaqueous electrolyte secondary battery according to an embodiment includes a negative electrode in which a negative electrode active material layer is disposed on a negative electrode collector, a positive electrode in which a positive electrode active material layer is disposed on a positive electrode collector, a nonaqueous electrolyte, a separator, and a porous protective film which is disposed on at least one of a surface of the negative electrode active material layer and a surface of the positive electrode active material layer and which contains fine particles, a binder, a surfactant, and a thickener.

Furthermore, a method for manufacturing an electrode with a porous protective film according to an embodiment includes the steps of preparing a porous protective film-forming slurry by mixing fine particles, a binder, a surfactant, a thickener, and a solvent and applying the above-described porous protective film-forming slurry to an electrode, in which an active material layer is disposed on a collector, and conducting drying.

According to an embodiment, for example, the porous protective film is disposed on the surface of the electrode by using the porous protective film-forming slurry containing the fine particles, the binder, the surfactant, and the thickener. Consequently, an electrode with a porous protective film can be provided, wherein excellent safety and an excellent discharge capacity maintenance factor are realized.

Furthermore, a nonaqueous electrolyte secondary battery can be provided, wherein desirable safety and an excellent discharge capacity maintenance factor are realized.

Moreover, a method for manufacturing an electrode with a porous protective film can be provided, wherein desirable safety and discharge capacity maintenance factor are realized.

Additional features and advantages are described in, and will be apparent from, the following Detailed Description and the figures.

DETAILED DESCRIPTION

Figure 1:
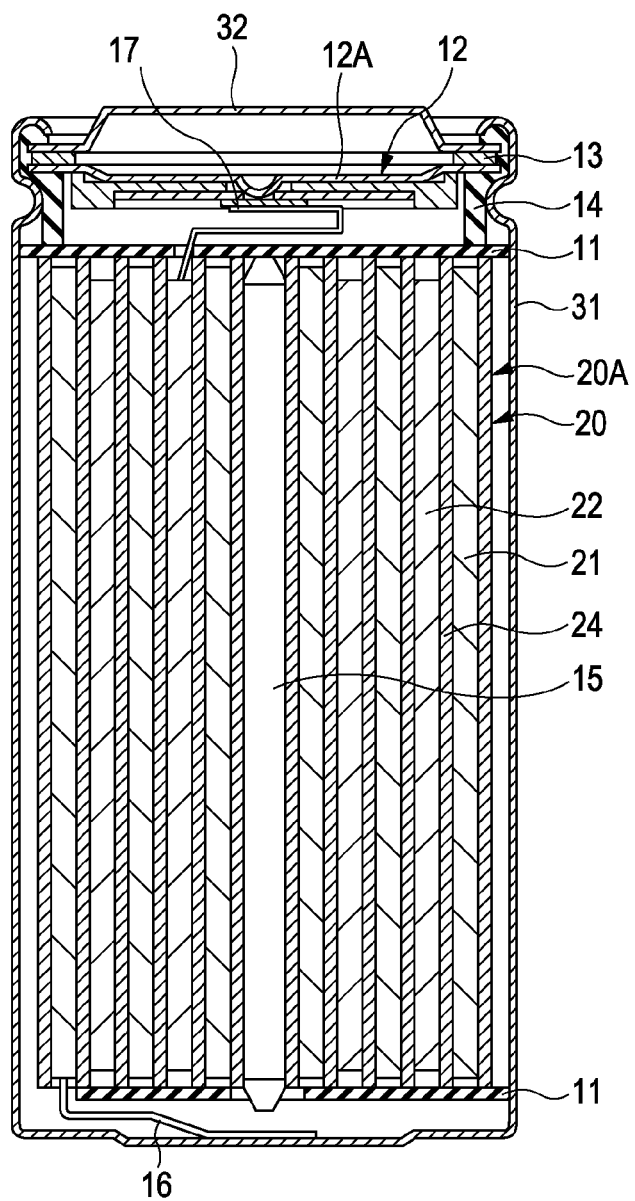
FIG. 1 is a schematic sectional view showing an example of the configuration of a nonaqueous electrolyte secondary battery according to a first embodiment.

Some embodiments according to the present application will be described below with reference to drawings. In all drawings according to the embodiments described below, the same or corresponding portions are indicated by the same reference numerals.

(1) First Embodiment (1-1) Configuration of Nonaqueous Electrolyte Secondary Battery FIG. 1 is a schematic sectional view showing an example of the configuration of a nonaqueous electrolyte secondary battery according to a first embodiment. This nonaqueous electrolyte secondary battery is of a so-called cylindrical type.

As shown in FIG. 1, this nonaqueous electrolyte secondary battery includes a rolled electrode member 20 in the inside of an electrode can 31 which is a part of an outer case member and which is substantially in the shape of a hollow cylinder. In the rolled electrode member 20, a negative electrode 21 and a positive electrode 22 are located opposing to each other with a separator 24 therebetween and are rolled.

The separator 24 includes a nonaqueous electrolytic solution which is an example of nonaqueous electrolytes. Incidentally, a combination of the rolled electrode member 20 and the nonaqueous electrolyte is referred to as a battery element 20A.

The battery can 31 is formed from, for example, iron (Fe) plated with nickel (Ni) and one end portion is closed and the other end portion is opened. In the inside of the battery can 31, one pair of insulating plates 11 are disposed perpendicularly to a circumferential surface of the roll in such a way as to sandwich the rolled electrode member 20.

A battery lid 32, which constitutes a part of the outer case member, and a safety valve mechanism 12 and a positive temperature coefficient element (PTC element) 13, which are disposed on the inner side of the battery lid 32, are attached to the open end portion of the battery can 31 by swaging with a sealing gasket 14 therebetween. The inside of the battery can 31 is sealed. The battery lid 32 is formed from, for example, the same material as the material for the battery can 31. The safety valve mechanism 12 is electrically connected to the battery lid 32 through the positive temperature coefficient element 13. In the case where the internal pressure of the battery becomes a predetermined value or more because of internal short-circuit, heating from the outside, or the like, a disk plate 12A is inverted and, thereby, electrical connection between the battery lid 32 and the rolled electrode member 20 is cut. The resistance value of the positive temperature coefficient element 13 increases when the temperature is raised and, thereby, a current is restricted so that abnormal heat generation due to a large current is prevented. The positive temperature coefficient element 13 is formed from, for example, barium titanate based semiconductor ceramic. The sealing gasket 14 is formed from, for example, an insulating material and the surface is coated with asphalt.

The rolled electrode member 20 is rolled around, for example, a center pin 15. A negative electrode lead 16 formed from, for example, nickel is connected to the negative electrode 21 of the rolled electrode member 20, and a positive electrode lead 17 formed from, for example, aluminum is connected to the positive electrode 22. The negative electrode lead 16 is welded to the battery can 31 so as to be electrically connected. The positive electrode lead 17 is welded to the safety valve mechanism 12 and, thereby, is electrically connected to the battery lid 32.

Figure 2:
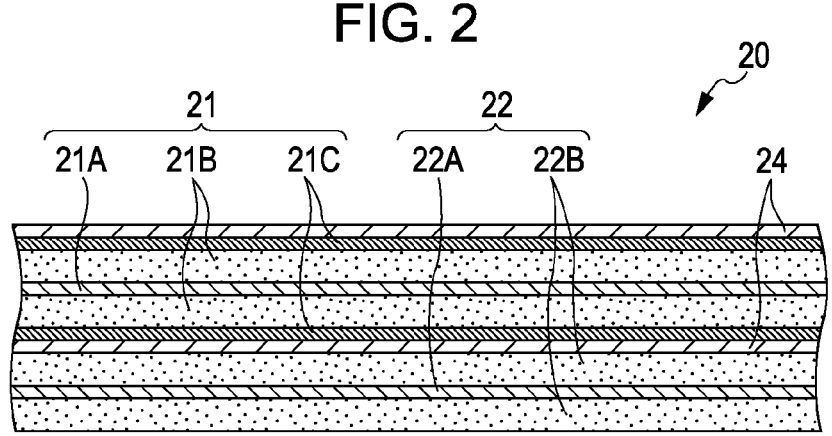
FIG. 2 is a magnified schematic sectional view of a part of a rolled electrode member shown in FIG. 1.

FIG. 2 is a magnified diagram showing a part of the rolled electrode member 20 shown in FIG. 1.

The negative electrode 21, the positive electrode 22, the separator 24, and the nonaqueous electrolyte will be described below sequentially with reference to FIG. 2.

Negative Electrode

The negative electrode 21 has a structure in which, for example, negative electrode active material layers 21B are disposed on both surfaces of a negative electrode collector 21A having a pair of surfaces opposite to each other. Furthermore, porous protective films 21C are disposed on surfaces of the negative electrode active material layers 21B.

Although not shown in the drawing, the negative electrode active material layer 21B may be disposed merely on one surface of the negative electrode collector 21A.

The negative electrode collector 21A is formed from, for example, metal foil, e.g., copper foil. The negative electrode active material layer 21B is configured to contain at least one type of negative electrode material, which can absorb and release lithium, as the negative electrode active material and, if necessary, may contain a binder, e.g., polyvinylidene fluoride. As for the binder, rubber binders, e.g., carboxymethyl cellulose (CMC) and styrene-butadiene rubber (SBR), may be used.

Regarding this secondary battery, the electrochemical equivalent of the negative electrode material, which can absorb and release lithium, is specified to be larger than the electrochemical equivalent of the positive electrode 22 and, thereby, deposition of lithium metal on the negative electrode 21 during charging is prevented.

As for the negative electrode active material, for example, carbon materials, a crystalline or amorphous metal oxide, and the like, which can absorb and release lithium, may be used. Examples of carbon materials include hard-to-graphitize carbon materials, e.g., coke and glassy carbon, and various types of graphite, which are highly crystalline carbon materials having developed crystalline structures. Specific examples include pyrolytic carbon, coke (pitch coke, needle coke, petroleum coke, and the like), graphite, glassy carbon, organic polymer compound fired products (products produced by firing phenol resins, furan resins, and the like at appropriate temperatures so as to carbonize), carbon fibers, and activated carbon.

Examples of negative electrode materials which can absorb and release lithium include materials which can absorb and release lithium and which contain at least one type of metal elements and half metal elements as a constituent element. A high energy density can be obtained by using such materials. In particular, the use in combination with the carbon material is more preferable because a high energy density can be obtained and, in addition, an excellent cycle characteristic can be obtained. The negative electrode materials may be simple substances, alloys, or compounds of the metal elements or half metal elements or be materials having a phase of at least one type of them as at least a part thereof.

In this regard, in the present application, the alloys may include alloys containing at least one type of metal element and at least one type of half metal element, besides alloys composed of at least two types of metal elements. Furthermore, nonmetal elements may be included. Examples of structures thereof include a solid solution, an eutectic, an intermetallic compound, and a structure in which at least two types thereof coexist.

Examples of metal elements or half metal elements constituting the negative electrode materials include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). They may be crystalline or amorphous.

Among them, it is preferable that the negative electrode material contains group 4B metal elements or half metal elements in the short form periodic table as constituent elements. It is particularly preferable that at least one of silicon (Si) and tin (Sn) is contained as a constituent element. This is because silicon (Si) and tin (Sn) have a large capability of absorbing and releasing lithium (Li) and, therefore, high energy densities can be obtained.

Examples of tin (Sn) alloys include alloys containing at least one type selected from the group of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as the second constituent elements other than tin (Sn).

Examples of silicon (Si) alloys include alloys containing at least one type selected from the group of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as the second constituent elements other than silicon (Si).

Examples of tin (Sn) compounds and silicon compounds include compounds containing oxygen (O) or carbon (C), and the above-described second constituent elements may be contained besides tin (Sn) or silicon (Si).

Examples of negative electrode materials which can absorb and release lithium further include other metal compounds and polymer materials. Examples of other metal compounds include oxides, e.g., $MnO_2$, $V_2O_5$, and $V_6O_{13}$, sulfides, e.g., NiS and MoS, and lithium nitrides, e.g., $LiN_3$. Examples of polymer materials include polyacetylenes, polyanilines, and polypyrroles.

The porous protective film 21C contains fine particles, a binder, a surfactant, and a thickener.

Preferably, the porous protective film contains the thickener at a ratio of 1 to 100 parts by weight relative to 100 parts by weight of fine particles, and more preferably at a ratio of 1 to 20 parts by weight.

If the content of the thickener is less than 1 part by weight, a sufficient discharge capacity maintenance factor may not be ensured. In the case where the content of the thickener exceeds 100 parts by weight as well, a sufficient discharge capacity maintenance factor may not be ensured.

As for the fine particles, insulating fine particles are used favorably from the viewpoint of prevention of physical and chemical internal short-circuit. Furthermore, fine particles containing a metal oxide or formed from a metal oxide are used favorably considering that the fine particles are used in the presence of a nonaqueous electrolyte and insolubility in a nonaqueous solvent is further desirable.

Examples of such metal oxides include alumina, titania, zirconia, and silica. They may be used alone or be used in combination. Most of all, it is preferable to use alumina.

The particle diameter of the fine particles may be within the range of, for example, 1 to 50 μm. However, 0.1 to 1.0 μm is preferable. This is because the effects of the following items (1) to (4) can be exerted in the case where the particle diameter of the fine particles are specified to be 0.1 to 1.0 μm.

(1) The penetration property of the nonaqueous electrolytic solution with respect to the porous protective film can be made better.

(2) Since the thickness of the porous protective film can be controlled appropriately, an occurrence of physical internal short-circuit can be suppressed so as to improve the safety.

(3) Reduction in discharge capacity maintenance factor of the battery can be suppressed.

(4) A porous protective film having an air permeability of 3 to 600 sec/100 ml is obtained easily.

It is desirable that the binder has the nonaqueous electrolytic solution resistance, and examples thereof include fluorine resins and rubber resins, although not specifically limited to them. They can be used alone or be used in combination, and it is preferable that resins on the basis of mixtures thereof are used. In the case where the mixture based resin is used, a porous protective film exhibiting flexibility and having a high strength can be formed.

Examples of fluororesins include polyvinylidene fluoride (PVdF). Examples of rubber resins include styrene-butadiene rubber (SBR), acrylic rubber, and butadiene rubber. They may be used alone or be used in combination.

It is preferable that the mass ratio A:B of the fluororesin A to the rubber resin B is 1:9 to 9:1. If the ratio of the fluororesin becomes smaller than the above-described ratio, it is difficult to maintain the strength of the porous protective film sufficiently. Consequently, in the case where a foreign matter is intruded in the battery, the resistance to physical short-circuit may deteriorate. Furthermore, if the ratio of the fluororesin becomes larger than the above-described ratio, the flexibility of the porous protective film deteriorates, the active material is dropped from the active material layer during running of a raw electrode band. In the case where a part of the dropped active material adheres to a surface of the electrode again, physical internal short-circuit may be invited.

As for the surfactant, for example, sodium dodecyl sulfate, lithium dodecyl sulfate, and sodium hexametaphosphate are used favorably. They may be used alone or be used in combination.

The thickener is not specifically limited insofar as the thickener dissolves into a solvent of a porous protective film-forming slurry. In consideration of the influence on the battery characteristics, examples of thickeners include hydroxyethyl cellulose (HEC), carboxymethyl cellulose (CMC), and polyethylene glycol (PEG). They may be used alone or in combination.

Figure 3:
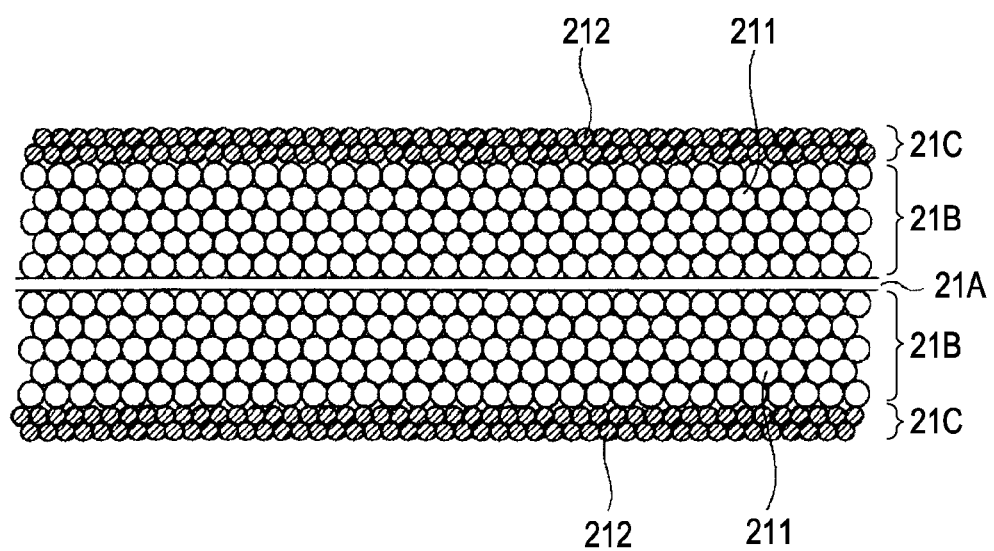
FIG. 3 is a magnified schematic sectional view of a part of a negative electrode shown in FIG. 1.

FIG. 3 is a magnified diagram showing a part of the negative electrode 21 shown in FIG. 1. A porous protective film 21C containing fine particles 212 is disposed on a surface of the negative electrode active material layer 21B containing a negative electrode active material 211 of the negative electrode 21.

As for the porous protective film, for example, a coating film may be used. The coating film is produced by preparing a porous protective film-forming slurry, in which fine particles are dispersed in a solvent together with a binder, a surfactant, and a thickener, and applying the resulting porous protective film-forming slurry to the negative electrode active material layer is used.

A porous film is used as the protective film in order that a primary function of the electrode, i.e. a reaction with electrolyte ions in the electrolytic solution, is not impaired.

It is preferable that the air permeability of the porous protective film is 3 to 600 sec/100 ml, and more preferably 10 to 100 sec/100 ml.

In this regard, although not shown in the drawing, in the case where the porous protective film is disposed merely on a surface of the positive electrode active material layer, it is preferable that the air permeability of the porous protective film disposed on the surface of the positive electrode active material layer is 3 to 600 sec/100 ml.

Furthermore, in the case where the porous protective films are disposed on both the surface of the positive electrode active material layer and the surface of the negative electrode active material layer, it is preferable that a total air permeability of the porous protective films disposed on the surface of the positive electrode active material layer and the surface of the negative electrode active material layer is 3 to 600 sec/100 ml.

If the air permeability is less than 3 sec/100 ml, the safety may deteriorate, and if 600 sec/100 sec is exceeded, the discharge capacity maintenance factor may deteriorate significantly.

It is preferable that the thickness of the porous protective film is specified to be within the range of 0.1 to 200 µm. In the case where the thickness of the porous protective film is less than 0.1 µm, the protection effect may become unsatisfactory and physical internal short-circuit may not be prevented satisfactorily.

Furthermore, in the case where the thickness of the porous protective film exceeds 200 µm, the porous protective film may interfere with the reaction between the electrode and ions in the electrolytic solution, so that the battery performance may deteriorate.

Positive Electrode

The positive electrode 22 has a structure in which, for example, positive electrode active material layers 22B are disposed on both surfaces of a positive electrode collector 22A having a pair of surfaces opposite to each other.

Although not shown in the drawing, the positive electrode active material layer 22B may be disposed merely on one surface of the positive electrode collector 22A.

The positive electrode collector 22A is formed from, for example, metal foil, e.g., aluminum foil.

For example, the positive electrode active material layer 22B contains at least one type of positive electrode material, which can absorb and release lithium, as the positive electrode active material and, if necessary, may contain an electrically conductive agent, e.g., graphite, and a binder, e.g., polyvinylidene fluoride.

As for the binder, rubber binders, e.g., carboxymethyl cellulose (CMC) and styrene-butadiene rubber (SBR), may be used.

As for the positive electrode active material, any positive electrode material, which can absorb and release lithium and which contains a sufficient amount of lithium, in the related art may be used.

Specifically, it is preferable that composite metal oxides, which is formed from lithium and a transition metal and which is represented by a general formula $LiMO_2$ (where M contains at least one type of Co, Ni, Mn, Fe, Al, V, and Ti), lithium-containing interlayer compounds, and the like are used.

Furthermore, $Li_aMX_b$ (where M represents one type selected from transition metals, X is selected from S, Se, and $PO_4$, and a and b represent integers satisfying $0<a$ and $0<b$) may also be used besides them.

In particular, it is preferable that lithium composite oxides represented by $Li_xMIO_2$ or $Li_yMII_2O_4$ are used as the positive electrode active material because a high voltage can be generated, and an energy density can be increased.

In these compositional formulae, MI represents at least one type of transition metal element and is preferably at least one of cobalt (Co) and nickel (Ni), MII represents at least one type of transition metal element and is preferably manganese (Mn), and the values of x and y are different depending on the charge and discharge state and are usually within the range of 0.05 or more, and 1.10 or less.

Specific examples of such lithium composite oxides include $LiCoO_2$, $LiNiO_2$, $LiNi_zCo_{1-z}O_2$ (where $0<z<1$ is satisfied), and $LiMn_2O_4$.

Separator

As for the separator 24, any material may be used insofar as the material is electrically stable and, in addition, chemically stable with respect to the negative electrode active material, the positive electrode active material, and the solvent, and has no electrical conductivity.

For example, nonwoven fabrics of polymers, porous films, and glass or ceramic fibers made into the shape of paper can be used. A plurality of them may be used by lamination.

In particular, it is preferable that a porous polyolefin film is used. This may be made into a composite with a heat-resistant material composed of fibers or the like of polyimide, glass, or ceramic and be used.

Nonaqueous Electrolyte

In a nonaqueous electrolytic solution, which is an example of nonaqueous electrolytes, for example, a lithium salt serving as an electrolytic salt is dissolved in a nonaqueous solvent.

Preferable examples of nonaqueous solvents include organic solvents, e.g., propylene carbonate, ethylene carbonate, diethyl carbonate, dimethyl carbonate, methyl ethyl carbonate, γ-butyrolactone, tetrahydrofuran, 1,2-dimethoxyethane, 1,3-dioxolane, 4-methyl-1,3-dioxolane, diethyl ether, sulfolane, methylsulfolane, acetonitrile, and propionitrile. These solvents may be used alone or in combination.

Examples of lithium salts include LiCl, LiClO4, LiAsF6, LiPF6, LiBF4, LiB(C6H5)4, LiBr, CH3SO3Li, CF3SO3Li, and N(CnF2n+1SO2)2Li. These salts may be used alone or in combination. Most of all, it is preferable that LiPF6 is used primarily.

(1-2) Method for Manufacturing Secondary Battery

The nonaqueous electrolyte secondary battery having the above-described configuration can be formed, for example, as described below.

For example, the negative electrode active material and the binder are mixed so as to prepare a negative electrode mix. The resulting negative electrode mix is dispersed into a solvent, e.g., 1-methyl-2-pyrrolidone or water, so as to produce a negative electrode mix slurry.

Subsequently, the resulting negative electrode mix slurry is applied to the negative electrode collector 21A, and the solvent is dried. Thereafter, compression molding is conducted with a roll-pressing machine or the like so as to form the negative electrode active material layer 21B. In this manner, the negative electrode 21 is produced.

Furthermore, for example, the positive electrode active material, the electrically conductive agent, and the binder are mixed so as to prepare a positive electrode mix. The resulting positive electrode mix is dispersed into a solvent, e.g., 1-methyl-2-pyrrolidone, so as to produce a positive electrode mix slurry.

Subsequently, the resulting positive electrode mix slurry is applied to the positive electrode collector 22A, and the solvent is dried. Thereafter, compression molding is conducted with a roll-pressing machine or the like so as to form the positive electrode active material layer 22B. In this manner, the positive electrode 22 is prepared.

Next, for example, the binder, the fine particles, the surfactant, and the thickener are dispersed into a solvent so as to prepare the porous protective film-forming slurry.

It is preferable that the concentration of the thickener is 0.1 to 2.0 percent by mass.

If the concentration is less than 0.1 percent by mass, a sufficient thickening effect may not be obtained and it may become difficult to ensure a coating gap and prevent penetration. If the concentration exceeds 2.0 percent by mass, the thickener causes plugging in the porous protective film, movement paths of the nonaqueous electrolytic solution and lithium ions may not be ensured sufficiently, so that the battery characteristics may be affected.

It is preferable that the concentration of the surfactant is 0.01 to 3.0 percent by mass. If the concentration is less than 0.01 percent by mass, a sufficient effect may not be exerted on prevention of an occurrence of cissing. If the concentration exceeds 3.0 percent by mass, large amounts of bubbles are generated during production, and it becomes difficult to produce the porous protective film-forming slurry.

Furthermore, it is preferable that the concentration of the surfactant is 0.05 to 1.0 percent by mass from the viewpoint of, for example, a step to mix the porous protective film-forming slurry. Moreover, the number of cissing on a electrode surface can be reduced by controlling the concentration of the porous protective film-forming slurry.

Here, cissing refers to a region at which a surface of the active material layer is exposed without being covered with the porous protective film.

It is preferable that the viscosity of the porous protective film-forming slurry is within the range of 0.1 to 3.5 Pa·s. The number of cissing can be reduced as the viscosity becomes higher.

If the viscosity is less than 0.1 Pa·s, the porous protective film-forming slurry penetrates into a surface of the active material layer and a sufficient porous protective film may not be formed. If the viscosity exceeds 3.5 Pa·s, the porous protective film-forming slurry may not uniformly spread throughout the coating gap and it may become difficult to form a uniform porous protective film.

Here, it is preferable that a total solid content of the porous protective film-forming slurry is specified to be within the range of 3 to 25 percent by mass. If the total solid content of the porous protective film-forming slurry is less than 3 percent by mass, settling and aggregation of fine particles in the porous protective film-forming slurry occur and it is difficult to produce the porous protective film-forming slurry stably. Furthermore, if the total solid content of the fine particle slurry exceeds 25 percent by mass, lumps are generated and it is difficult to form a slurry.

In this regard, the total solid content refers to a total sum of solids except the solvent and indicates a total sum of, for example, the binder, the fine particles, the surfactant, and the thickener.

Subsequently, the porous protective film-forming slurry is applied to the surface of the negative electrode active material layer. Consequently, the binder in the porous protective film-forming slurry gathers in the vicinity of the interfaces of contact between fine particles or the interfaces of contact between fine particles and the positive electrode active material layer.

In this manner, portions other than the contact interfaces come into the state of so-called holes, and a porous protective film having a plurality of such hole portions is formed.

A negative electrode lead 16 is attached to the negative electrode collector 21A through welding or the like and, in addition, a positive electrode lead 17 is attached to the positive electrode collector 22A through welding or the like.

Then, the negative electrode 21 and the positive electrode 22 are rolled with the separator 24 therebetween, an end portion of the negative electrode lead 16 is welded to the battery can 31, an end portion of the positive electrode lead 17 is welded to the safety valve mechanism 12, and the rolled negative electrode 21 and the positive electrode 22 are sandwiched between a pair of insulating plates 11 and are held into the inside of battery can 31.

After the negative electrode 21 and the positive electrode 22 are held into the inside of the battery can 31, the nonaqueous electrolytic solution is injected into the inside of the battery can 31 so as to impregnate the separator 24 with the nonaqueous electrolytic solution.

Subsequently, a battery lid 32, a safety valve mechanism 12, and a positive temperature coefficient element 13 are fixed to an open end portion of the battery can 31 by swaging with a sealing gasket 14 therebetween, so that the nonaqueous electrolyte secondary battery shown in FIG. 1 is completed.

As described above, according to the present first embodiment, the porous protective film is disposed on the surface of the negative electrode active material layer. Consequently, even when dropping of the active material and intrusion of a fine particle metal piece occur after formation of the active material layer until the electrodes are held into the battery can, physical internal short-circuit induced by them can be suppressed.

Therefore, the safety of the battery can be improved.

Furthermore, the binder, the fine particles, the surfactant, the thickener, and the solvent are mixed so as to prepare the porous protective film-forming slurry. The resulting porous protective film-forming slurry is applied to the electrode, so that the electrode surface can be prevented from being exposed without being covered with the porous protective film-forming slurry.

Consequently, an occurrence of physical internal short-circuit due to exposure of the active material layer surface can be suppressed. That is, the safety of the battery can be further improved.

Moreover, in the case where the properties of the porous protective film-forming slurry and the porous protective film are appropriately selected, the safety and the cycle characteristic of the battery can be further improved.

For example, in the case where the air permeability of the porous protective film is controlled within the range of 3 to 600 sec/100 ml, the discharge capacity maintenance factor after the cycle test becomes larger than or equal to that in the case where a porous protective film is not disposed.

Consequently, internal short-circuit can be suppressed without deteriorating the battery performance, and a battery exhibiting high safety can be obtained.

(2) Second Embodiment (2-1) Configuration of Secondary Battery

Figure 4:
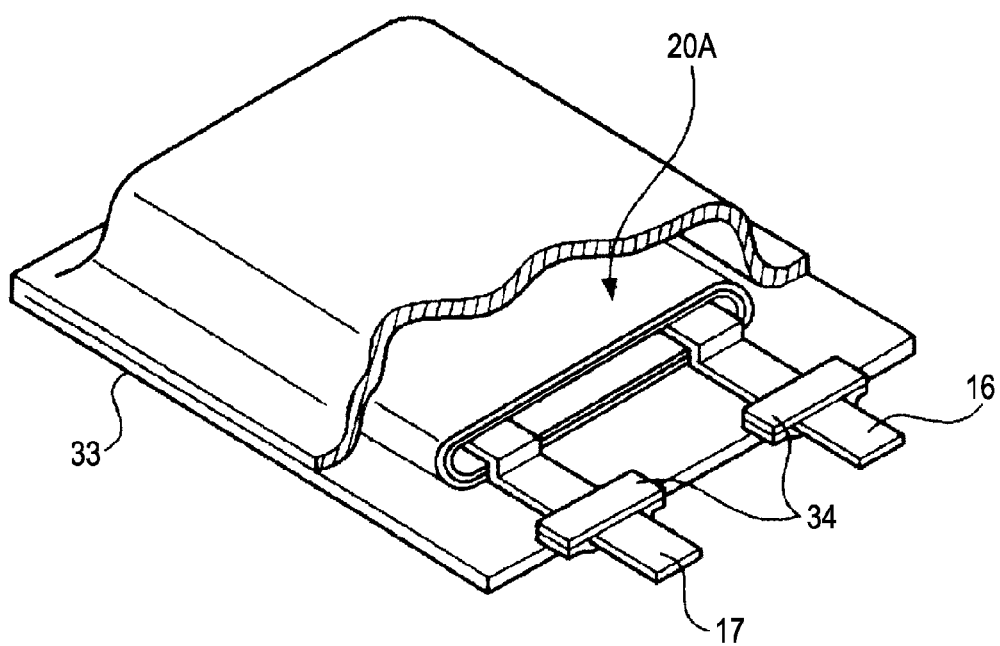
FIG. 4 is a perspective view showing an example of the configuration of a nonaqueous electrolyte secondary battery according to a second embodiment.

FIG. 4 is a perspective view showing an example of the configuration of a nonaqueous electrolyte secondary battery according to a second embodiment.

In this nonaqueous electrolyte secondary battery, a battery element 20A, to which a negative electrode lead 16 and a positive electrode lead 17 are attached, is held in the inside of a laminate film 33, which is an example of an outer case member, and miniaturization, weight reduction, and thickness reduction can be facilitated.

Each of the negative electrode lead 16 and the positive electrode lead 17 is led from the inside of the laminate film 33 toward the outside, for example, in the same direction.

Each of the negative electrode lead 16 and the positive electrode lead 17 is formed from a metal material, e.g., aluminum (Al), copper (Cu), nickel (Ni), or stainless steal, and is in the shape of a thin sheet or a mesh.

The laminate film 33 is formed from, for example, a rectangular aluminum laminate film in which a nylon film, aluminum foil, and a polyethylene film are bonded together in that order.

The aluminum laminate film is disposed in such a way that, for example, the polyethylene film side and the battery element 20A are opposed to each other, and individual outer edge portions are mutually adhered through fusion or with an adhesive. Adhesion films 34 for preventing intrusion of the outside air are inserted between the laminate film and the negative electrode lead 16 and between the laminate film and the positive electrode lead 17.

The adhesion film 34 is formed from a material, for example, an olefin resin, e.g., polyethylene, polypropylene, modified polyethylene, or modified polypropylene, which has adhesion to the negative electrode lead 16 and the positive electrode lead 17.

In this regard, the laminate film 33 may be formed from a laminate film having another structure, a polymer film, e.g., a polypropylene film, or a metal film instead of the above-described aluminum laminate film.

Figure 5:
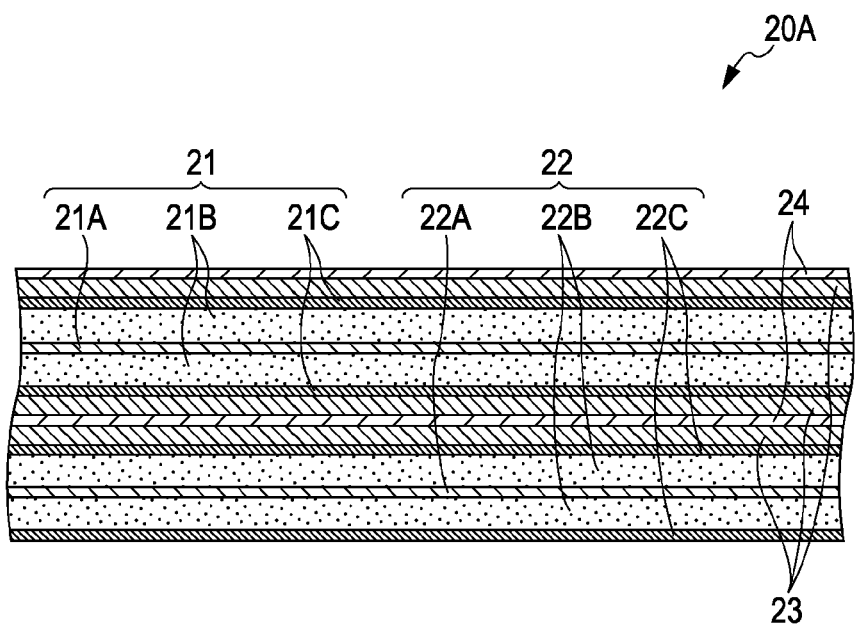
FIG. 5 is a magnified schematic sectional view of a part of a rolled electrode member shown in FIG. 4.

FIG. 5 is a magnified diagram of a part of the battery element 20A shown in FIG. 4.

The battery element 20A is produced by laminating a negative electrode 21 and a positive electrode 22 with a nonaqueous electrolyte layer 23 and a separator 24 therebetween and rolling them. An outermost circumferential portion is protected by a protective tape.

The negative electrode 21 has a structure in which a negative electrode active material layer 21B is disposed on one surface or both surfaces of the negative electrode collector 21A. A porous protective film 21C is disposed on one surface or both surfaces of the negative electrode active material layer 21B.

The positive electrode 22 has a structure in which a positive electrode active material layer 22B is disposed on one surface or both surfaces of the positive electrode collector 22A and is arranged in such a way that the negative electrode active material layer 21B and the positive electrode active material layer 22B are opposed to each other. A porous protective film 22C is disposed on one surface or both surfaces of the positive electrode active material layer 22B.

In the present embodiment, the case where the porous protective film is disposed on both the surface of the negative electrode active material layer and the surface of the positive electrode active material layer will be described as an example. However, the porous protective film may be disposed on one of the surface of the negative electrode active material layer and the surface of the positive electrode active material layer.

The individual configurations of the negative electrode collector 21A, the negative electrode active material layer 21B, the porous protective film 21C, the positive electrode collector 22A, the positive electrode active material layer 22B, the porous protective film 22C, and the separator 24 are the same as those in the first embodiment, respectively.

The nonaqueous electrolyte layer 23 contains a nonaqueous electrolytic solution and a polymer compound serving as a holder to hold the nonaqueous electrolytic solution and is in the state of so-called gel.

The gel-like nonaqueous electrolyte layer 23 is preferable because a high ionic conductivity can be obtained and, in addition, leakage of liquid of the battery can be prevented.

The configuration of the nonaqueous electrolytic solution (that is, the nonaqueous solvent, the electrolyte salt, and the like) is the same as that of the nonaqueous electrolyte secondary battery according to the above-described first embodiment.

Examples of polymer compounds include polyacrylonitrile, polyvinylidene fluoride, copolymers of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylate, polymethacrylate, styrene-butadiene rubber, nitrile-butadiene rubber, polystyrene, and polycarbonate.

In particular, polyacrylonitrile, polyvinylidene fluoride, polyhexafluoropropylene, polyethylene oxide, and the like are preferable in consideration of the electrochemical stability.

(2-2) Method for Manufacturing Secondary Battery

The nonaqueous electrolyte secondary battery having the above-described configuration can be formed, for example, as described below.

Initially, a precursor solution containing a nonaqueous solvent, an electrolyte salt, a polymer compound, and a mixed solvent is applied to each of the negative electrode 21 and the positive electrode 22. The mixed solvent is volatilized so as to form the nonaqueous electrolyte layer 23.

Thereafter, a negative electrode lead 16 is attached to an end portion of the negative electrode collector 21A through welding or the like and, in addition, a positive electrode lead 17 is attached to an end portion of the positive electrode collector 22A through welding or the like.

Then, the negative electrode 21 and the positive electrode 22, each provided with the nonaqueous electrolyte layer 23, are laminated with the separator 24 therebetween so as to produce a laminate. The resulting laminate is rolled in the longitudinal direction thereof and a protective tape is bonded to the outermost circumferential portion, so that a battery element 20A is formed.

Finally, for example, the battery element 20A is sandwiched between the laminate films 33, outer edge portions of the laminate films 33 are mutually adhered through heat-fusion or the like so as to seal.

At that time, adhesion films 34 are inserted between the negative electrode lead 16 and the laminate film 33 and between the positive electrode lead 17 and the laminate film 33.

In this manner, the nonaqueous electrolyte secondary battery shown in FIG. 4 is obtained.

Alternatively, this nonaqueous electrolyte secondary battery may be produced as described below.

First, the negative electrode 21 and the positive electrode 22 are produced as described above. The negative electrode lead 16 and the positive electrode lead 17 are attached to the negative electrode 21 and the positive electrode 22. Thereafter, the negative electrode 21 and the positive electrode 22 are laminated with the separator 24 therebetween, followed by rolling. A protective tape is bonded to the outermost circumferential portion, so that a rolled electrode member serving as a precursor of the battery element 20A is formed.

Subsequently, the resulting rolled electrode member is sandwiched between the laminate films 33, outer edge portions except one side are heat-fused, so that the shape of a bag results and the rolled electrode member is held in the inside of the laminate films 33.

Then, a nonaqueous electrolyte layer-forming composition containing a nonaqueous solvent, an electrolyte salt, a monomer serving as a raw material for a polymer compound, a polymerization initiator, and if necessary, other materials, e.g., a polymerization inhibitor, is prepared and is injected into the inside of the laminate films 33 formed into the shape of a bag.

After the nonaqueous electrolyte layer-forming composition is injected, an opening portion of the laminate films 33 formed into the shape of a bag is heat-fused under a vacuum atmosphere so as to seal.

Next, heat is applied to polymerize the monomer to a polymer compound, so that a gel-like nonaqueous electrolyte layer 23 is formed.

In this manner, the nonaqueous electrolyte secondary battery shown in FIG. 4 is obtained.

The operation and the effect of this second embodiment is similar to those in the above-described first embodiment.

EXAMPLES

The present application will be described below in further detail with reference to the examples and comparative examples.

Specifically, the nonaqueous electrolyte secondary batteries, as shown in FIG. 1, were produced by conducting operations described in the following individual examples, and the performance thereof was evaluated.

Example 1

First, a negative electrode mix was prepared by mixing 97.6 parts by weight of graphite serving as a negative electrode active material, 1.2 parts by weight of styrene-butadiene rubber (SBR) serving as a binder, and 1.2 parts by weight of carboxymethyl cellulose (CMC). The resulting negative electrode mix was dispersed into ion-exchanged water serving as a solvent, so that a negative electrode mix slurry was prepared.

The resulting negative electrode mix slurry was applied uniformly to both surfaces of band-shaped copper foil having a thickness of 8 µm. Drying was conducted and compression molding was conducted with a pressing machine so as to produce a band-shaped negative electrode.

A porous protective film-forming slurry was prepared by mixing 5.0 parts by weight of alumina powder having an average particle diameter of 0.3 µm serving as fine particles, 1.0 part by weight of polyvinylidene fluoride (PVdF) serving as a binder, 0.1 parts by weight of lithium dodecyl sulfate serving as a surfactant, 0.05 parts by weight of hydroxyethyl cellulose (HEC) serving as a thickener, and 93.85 parts by weight of 1-methyl-2-pyrrolidone serving as a solvent.

The porous protective film-forming slurry was applied to the surface of the negative electrode active material layer in such a way that the thickness of the porous protective film becomes 3 µm, and the areal density becomes 0.5 mg/cm2. Drying was conducted and compression molding was conducted with a pressing machine so as to form a porous protective film.

In this regard, after the molding, the film thickness of the negative electrode active material layer was 180 µm on two surfaces of negative electrode active material basis, the widths were 58.5 mm, and the lengths were 581 mm/522 mm, respectively.

Next, a positive electrode mix was prepared by mixing 96.7 parts by weight of LiCoO2 serving as a positive electrode active material, 1.3 parts by weight of graphite serving as an electrically conductive agent, and 2.0 parts by weight of polyvinylidene fluoride (PVdF) serving as a binder. The resulting positive electrode mix was dispersed into 1-methyl-2-pyrrolidone serving as a solvent, so that a positive electrode mix slurry was prepared.

The resulting positive electrode mix slurry was applied uniformly to both surfaces of band-shaped aluminum foil having a thickness of 15 µm. Drying was conducted and compression molding was conducted with a pressing machine so as to prepare a band-shaped positive electrode.

In this regard, after the molding, the film thickness of the positive electrode active material layer was 175 µm on two surfaces basis, the widths were 57.5 mm, and the lengths were 533 mm/521 mm, respectively.

The thus produced band-shaped negative electrode and the band-shaped positive electrode were laminated with a microporous polypropylene film having a thickness of 18 µm and a width of 60.3 mm therebetween in the order of the negative electrode, the separator, the positive electrode and the separator, so that a laminated electrode member having a four-layer structure was formed.

The resulting laminated electrode member was spirally rolled a plurality of turns along the length direction, with the negative electrode inside. Furthermore, an end portion of the separator located at an outermost circumference was fixed with a tape, so that a rolled electrode member was produced.

The outer diameter of the resulting rolled electrode member was about 17.4 mm.

The rolled electrode member produced as described above was held into an iron battery can plated with nickel plating, and insulating plates were disposed on both upper and lower surfaces of the rolled electrode member.

In order to collect the current of the negative electrode, a nickel negative electrode lead was led from the copper foil and was welded to the battery can. Furthermore, in order to collect the current of the positive electrode, an aluminum lead was led from the aluminum foil and was welded to a battery lid.

Thereafter, 5.1 g of nonaqueous electrolytic solution, in which lithium hexafluorophosphate (LiPF6) was dissolved in an equal-volume mixed solvent of propylene carbonate and diethyl carbonate, was injected into the battery can holding the rolled electrode member, so that the rolled electrode member was impregnated therewith.

Subsequently, the battery lid was fixed by swaging the battery can with an insulative sealing gasket therebetween and, thereby, airtightness in the battery was ensured, so that a cylindrical nonaqueous electrolytic solution secondary battery having a diameter of 18 mm and a height of 65 mm was produced.

Example 2

A nonaqueous electrolyte secondary battery of the present example was obtained through the operations similar to those in Example 1 except that a porous protective film-forming slurry produced by mixing 5.0 parts by weight of alumina powder having an average particle diameter of 0.3 µm serving as fine particles, 1.0 part by weight of polyvinylidene fluoride (PVdF) serving as a binder, 0.1 parts by weight of lithium dodecyl sulfate serving as a surfactant, 0.10 parts by weight of hydroxyethyl cellulose (HEC) serving as a thickener, and 93.8 parts by weight of 1-methyl-2-pyrrolidone serving as a solvent was used.

Example 3

A nonaqueous electrolyte secondary battery of the present example was obtained through the operations similar to those in Example 1 except that a porous protective film-forming slurry produced by mixing 5.0 parts by weight of alumina powder having an average particle diameter of 0.3 µm serving as fine particles, 1.0 part by weight of polyvinylidene fluoride (PVdF) serving as a binder, 0.1 parts by weight of lithium dodecyl sulfate serving as a surfactant, 0.50 parts by weight of hydroxyethyl cellulose (HEC) serving as a thickener, and 93.4 parts by weight of 1-methyl-2-pyrrolidone serving as a solvent was used.

Example 4

A nonaqueous electrolyte secondary battery of the present example was obtained through operations similar to those in Example 1 except that a porous protective film-forming slurry produced by mixing 5.0 parts by weight of alumina powder having an average particle diameter of 0.3 µm serving as fine particles, 1.0 part by weight of polyvinylidene fluoride (PVdF) serving as a binder, 0.1 parts by weight of lithium dodecyl sulfate serving as a surfactant, 1.0 part by weight of hydroxyethyl cellulose (HEC) serving as a thickener, and 92.9 parts by weight of 1-methyl-2-pyrrolidone serving as a solvent was used.

Example 5

A nonaqueous electrolyte secondary battery of the present example was obtained through operations similar to those in Example 1 except that a porous protective film-forming slurry produced by mixing 5.0 parts by weight of alumina powder having an average particle diameter of 0.3 µm serving as fine particles, 1.0 part by weight of polyvinylidene fluoride (PVdF) serving as a binder, 0.1 parts by weight of lithium dodecyl sulfate serving as a surfactant, 3.0 parts by weight of hydroxyethyl cellulose (HEC) serving as a thickener, and 90.9 parts by weight of 1-methyl-2-pyrrolidone serving as a solvent was used.

Example 6

A nonaqueous electrolyte secondary battery of the present example was obtained through operations similar to those in Example 1 except that a porous protective film-forming slurry produced by mixing 5.0 parts by weight of alumina powder having an average particle diameter of 0.3 µm serving as fine particles, 1.0 part by weight of polyvinylidene fluoride (PVdF) serving as a binder, 0.1 parts by weight of lithium dodecyl sulfate serving as a surfactant, 5.0 parts by weight of hydroxyethyl cellulose (HEC) serving as a thickener, and 88.9 parts by weight of 1-methyl-2-pyrrolidone serving as a solvent was used.

Comparative Example 1

A nonaqueous electrolyte secondary battery of the present comparative example was obtained through operations similar to those in Example 1 except that a porous protective film-forming slurry produced by mixing 5.0 parts by weight of alumina powder having an average particle diameter of 0.3 µm serving as fine particles, 1.0 part by weight of polyvinylidene fluoride (PVdF) serving as a binder, 0.1 parts by weight of lithium dodecyl sulfate serving as a surfactant, and 93.9 parts by weight of 1-methyl-2-pyrrolidone serving as a solvent was used.

Comparative Example 2

A nonaqueous electrolyte secondary battery of the present comparative example was obtained through operations similar to those in Example 1 except that a porous protective film-forming slurry produced by mixing 10.0 parts by weight of alumina powder having an average particle diameter of 0.3

µm serving as fine particles, 2.0 parts by weight of polyvinylidene fluoride (PVdF) serving as a binder, 0.1 parts by weight of lithium dodecyl sulfate serving as a surfactant, and 87.9 parts by weight of 1-methyl-2-pyrrolidone serving as a solvent was used.

In this regard, in order to specify the mixing ratio of the alumina powder to the binder to be 5:1, 2.0 parts by weight of polyvinylidene fluoride (PVdF) was mixed relative to 10.0 parts by weight of alumina powder.

Comparative Example 3

A nonaqueous electrolyte secondary battery of the present comparative example was obtained through operations similar to those in Example 1 except that a porous protective film-forming slurry produced by mixing 15.0 parts by weight of alumina powder having an average particle diameter of 0.3 µm serving as fine particles, 3.0 parts by weight of polyvinylidene fluoride (PVdF) serving as a binder, 0.1 parts by weight of lithium dodecyl sulfate serving as a surfactant, and 81.9 parts by weight of 1-methyl-2-pyrrolidone serving as a solvent was used.

In this regard, in order to specify the mixing ratio of the alumina powder to the binder to be 5:1, 3.0 parts by weight of polyvinylidene fluoride (PVdF) was mixed relative to 15.0 parts by weight of alumina powder.

Comparative Example 4

A nonaqueous electrolyte secondary battery of the present comparative example was obtained through operations similar to those in Example 1 except that a porous protective film was not disposed on the surface of the negative electrode active material layer.

Performance Evaluation (Status of Penetration of Porous Protective Film-Forming Slurry into Negative Electrode Active Material Layer and Slurry Viscosity)

Regarding each of the batteries produced as described above, a cross-section of the negative electrode with the porous protective film was cut with CP, the cross-section was observed with a scanning electron microscope (SEM) and, thereby, a depth of penetration of the porous protective film-forming slurry was determined. At this time, the top portion of the surface of the negative electrode active material layer was taken as the reference. Furthermore, the viscosity of the porous protective film-forming slurry was measured with a Brookfield viscometer.

The obtained results are shown in Table 1.

(Measurement of Peel Strength)

The peel strength (binding force between the collector and the negative electrode active material layer) of the negative electrode produced as described above was measured by a 180-degree peeling method.

The obtained results are also shown in Table 1.

(Measurement of Air Permeability)

Regarding each of the batteries produced as described above, a cast film was prepared from the porous protective film-forming slurry, and the air permeability was measured by using Gurley densometer produced by Toyo Seiki Seisakusho, Ltd. The air permeability refers to a time necessary for the air to pass through the film, and the unit is sec/100 ml. As this value increases, air permeability of the porous protective film deteriorates, plugging occurs, and movement paths of the nonaqueous electrolytic solution and lithium ions are not ensured sufficiently, so that the battery characteristics are affected.

The obtained results are also shown in Table 1.

(Rate of Occurrence of Internal Short-Circuit)

Regarding each of the batteries produced as described above, fine Ni metal pieces were put into the battery, and the rate of occurrence of internal short-circuit was examined as described below.

The battery was initially charged just after preparation and was stood for a week.

After standing for a week, the open circuit voltage was measured. The case where this voltage was smaller than or equal to the reference voltage was evaluated as "there is internal short-circuit". The rate (%) of occurrence of internal short-circuit (=(the number of batteries evaluated as "there is internal short-circuit"/the total number of batteries evaluated)×100) was determined on the basis of the evaluation result.

The obtained results are also shown in Table 1.

(Discharge Capacity Maintenance Factor)

Regarding each of the batteries produced as described above, the discharge capacity maintenance factor was evaluated as described below. That is, a cycle test, in which charging and discharging was assumed to be one cycle, was conducted, and the discharge capacity maintenance factor (%) after 500 cycles (=discharge capacity in the 500th cycle/discharge capacity in the 1st cycle)×100) was determined.

The obtained results are also shown in Table 1.

In Table 1, "thickener content (part by weight)" refers to part by weight of the thickener relative to 100 parts by weight of the fine particles.

Furthermore, "thickener concentration (percent by mass)" refers to concentration of the thickener in the porous protective film-forming slurry.

TABLE 1

|  | Example 1 | Example 2 | Example 3 | Example 4 | Example 5 | Example 6 | Comparative example 1 | Comparative example 2 | Comparative example 3 | Comparative example 4 |
|---|---|---|---|---|---|---|---|---|---|---|
| Thickener content (parts by weight) | 1 | 2 | 10 | 20 | 60 | 100 | 0 | 0 | 0 | — |
| Thickener concentration (percent by mass) | 0.05 | 0.10 | 0.50 | 1.0 | 3.0 | 5.0 | 0 | 0 | 0 | — |
| Depth of penetration (µm) | 3 | 1 | 0 | 0 | 0 | 0 | 10 | 8 | 4 | — |
| Slurry viscosity (Pa·s) | 0.11 | 0.21 | 0.37 | 0.57 | 1.02 | 3.02 | 0.04 | 0.07 | 0.10 | — |

TABLE 1-continued

|  | Example 1 | Example 2 | Example 3 | Example 4 | Example 5 | Example 6 | Comparative example 1 | Comparative example 2 | Comparative example 3 | Comparative example 4 |
|---|---|---|---|---|---|---|---|---|---|---|
| Peel strength (mN/mm) | 4.7 | 9.4 | 23.8 | 24.5 | 23.1 | 24.9 | 1.6 | 3.8 | 4.8 | 24.3 |
| Air permeability (sec/100 ml) | 12 | 15 | 27 | 69 | 158 | 348 | 10 | 11 | 12 | — |
| Rate of occurrence of internal short-circuit (%) | 2 | 2 | 0 | 0 | 0 | 0 | 12 | 10 | 8 | 36 |
| Discharge capacity maintenance factor (%) | 77 | 85 | 86 | 65 | 52 | 37 | 69 | 71 | 75 | 78 |

Regarding Comparative examples 1 to 3, the concentrations of the fine particles are 5 to 15 percent by mass, as in the related art. Therefore, in the case where the porous protective films are formed by applying the porous protective film-forming slurries containing no thickener, the coating gaps are very narrow.

Consequently, a problem occurs in that a head of a coating apparatus come into contact with unevenness at start of application and end of application of the negative electrode active material layer.

However, a coating gap enough for avoiding unevenness of the negative electrode active material layer can be ensured by reducing the concentration of the fine particles to 5 percent by mass and, furthermore, adding hydroxyethyl cellulose to increase the viscosity.

As is clear from Table 1, in Comparative examples 1 to 3 in which no thickener is added, penetration into the negative electrode active material layer increases as the solid concentration is reduced and the viscosity of the slurry is reduced.

For example, in the case where the rubber resin serving as the binder is contained in the negative electrode active material layer, if a solvent based porous protective film-forming slurry penetrates, the rubber resin in the negative electrode active material layer is swelled with a solvent contained in the porous protective film-forming slurry.

Swelling may cause problems in that the negative electrode active material layer is deformed, the peel strength is reduced significantly and, thereby, the suitability for production deteriorates or an active material layer is peeled from the collector, the electrical conductivity is not ensured so as to deteriorate the battery performance, e.g., the cycle characteristic.

Furthermore, addition of hydroxyethyl cellulose, which is an example of thickeners, increases the viscosity and reduces penetration.

The reason for this is that after the porous protective film-forming slurry is applied, the viscosity is high and, therefore, drying can be conducted before penetration occurs, so as to form the porous protective film.

Moreover, in the case where the concentration of hydroxyethyl cellulose is specified to be 0.50 percent by mass or more, the amount of penetration becomes zero and the peel strength can be maintained. In this regard, in Example 3, the hydroxyethyl cellulose content in the porous protective film is 7.6 percent by mass.

As is clear from Table 1, the peel strength is reduced as the amount of penetration of the porous protective film-forming slurry into the negative electrode active material layer increases.

This is because in the case where the rubber resin serving as the binder is contained in the negative electrode active material layer, if a solvent based porous protective film-forming slurry penetrates, the rubber resin in the negative electrode active material layer is swelled with a solvent contained in the porous protective film-forming slurry.

In the case where hydroxyethyl cellulose is specified to be 0.50 percent by mass or more, the amount of penetration becomes zero and, thereby, the result of the peel strength was equivalent to that in Comparative example 4 in which a porous protective film was not disposed.

Furthermore, in Comparative examples 1 to 3 in which the amounts of penetration were large, the peel strength was reduced significantly and, therefore, the active material dropped from the negative electrode active material layer during rolling of the electrode was observed.

As is clear from Table 1, if the concentration of hydroxyethyl cellulose exceeds 1.0 percent by mass, the air permeability of the cast film of the porous protective film increases. In this regard, in Example 4, the hydroxyethyl cellulose content in the porous protective film is 14 percent by mass.

This is because hydroxyethyl cellulose fills into gap portions of the porous protective film, the air permeability deteriorates so as to cause plugging.

In the case where the air permeability is 30 sec/100 ml or less, the discharge capacity maintenance factor after 500 cycles is larger than or equal to that of Comparative example 4 in which a porous protective film was not disposed. Therefore, it becomes possible to produce a battery, wherein the battery performance does not deteriorate as compared with that in the related art even when hydroxyethyl cellulose is added.

As is clear from Table 1, in the case where hydroxyethyl cellulose is added and penetration of the porous protective film-forming slurry into the negative electrode active material layer is small, the rate of occurrence of internal short-circuit is reduced.

On the other hand, regarding Comparative examples 1 to 3 in which penetration of the porous protective film-forming slurry into the negative electrode active material layer is large, the rate of occurrence of internal short-circuit increases.

The reason for this is believed to be that the peel strength is reduced significantly, a part of the active material dropped from the negative electrode active material layer during rolling of the electrode intrudes and, thereby, physical internal short-circuit results.

The internal short-circuit resistance was also ascertained with respect to the porous protective film containing hydroxyethyl cellulose, and internal short-circuit can be prevented even when metal fine particles of Ni or the like intrude into the battery.

As is clear from Table 1, even when the porous protective film containing hydroxyethyl cellulose was disposed on the negative electrode active material layer, the discharge capacity maintenance factor after 500 cycles larger than or equal to that of Comparative example 4, in which a porous protective film was not disposed on the negative electrode active material layer, was exhibited insofar as the air permeability was 30 sec/100 ml or less.

On the other hand, regarding Comparative examples 1 to 3, in which hydroxyethyl cellulose was not added, the discharge capacity maintenance factors after 500 cycles were lower than that in Comparative example 4, even though the air permeability was about 10 sec/100 ml.

This is because the electrode in the battery is expanded and shrunk repeatedly through charging and discharging during the cycle test and, therefore, if the peel strength is low, the negative electrode active material layer is peeled off the copper foil of the collector so as to deteriorate continuity.

Furthermore, if the amount of addition of hydroxyethyl cellulose becomes 1.0 percent by mass or more, the discharge capacity maintenance factor after 500 cycles is reduced as the air permeability increases.

If the concentration of hydroxyethyl cellulose is specified to be 5.0 percent by mass, the air permeability becomes 348 sec/100 ml and the discharge capacity maintenance factor after 500 cycles is reduced to 37%.

Consequently, addition of hydroxyethyl cellulose is effective in consideration of maintenance of the battery characteristics, but it is desirable that the amount of addition is specified to be 1.0 percent by mass or less. In this regard, in Example 4, the hydroxyethyl cellulose content in the porous protective film is 14 percent by mass.

According to synthetic consideration of the above-described evaluation results, the coating gap can be widened by adding hydroxyethyl cellulose, a stable porous protective film can be produced, and penetration into the negative electrode active material layer is prevented because of a high viscosity so as to ensure peel strength.

Furthermore, since the peel strength is maintained, an occurrence of physical internal short-circuit due to dropped negative electrode active material layer can be eliminated.

Moreover, it is clear that formation of porous protective film containing hydroxyethyl cellulose on the active material layer surface is very effective on suppression of physical internal short-circuit due to dropped active materials, fine metal particles, and the like and the battery characteristics, e.g., the discharge capacity maintenance factor, can be maintained.

Up to this point, the present application has been explained with reference to some embodiments and examples. However, the present application is not limited to them, and various modification can be made within the gist.

Furthermore, in the above-described examples, the cases where the porous protective film is disposed merely on the negative electrode are explained. However, similar effects are also exerted in the case where the porous protective film is disposed merely on the positive electrode or in the case where the porous protective film is disposed on both the positive electrode and the negative electrode.

For example, in the above-described embodiments and the examples, the cases where nonaqueous electrolytic solutions and gel-like nonaqueous electrolytes are used as the nonaqueous electrolyte are explained. However, the present application can be applied to the case where a polymer solid electrolyte containing a simple substance or a mixture of electrically conductive polymer compounds is used.

Specific examples of electrically conductive polymer compounds contained in the polymer solid electrolytes include silicon polymers, acrylic polymers, acrylonitrile, polyphosphazene-modified polymers, polyethylene oxides, polypropylene oxides, fluoropolymers, and composite polymers, cross-linked polymers, modified polymers, and the like thereof. In particular, examples of the above-described fluoropolymers include poly(vinylidene fluoride), poly(vinylidene fluoride-co-hexafluoropropylene), poly(vinylidene fluoride-co-tetrafluoroethylene), and poly(vinylidene fluoride-co-trifluoroethylene).

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An electrode with a porous protective film, the electrode comprising:
    an electrode in which an active material layer is disposed on a collector; and
    a porous protective film which is disposed on a surface of the active material layer and which contains fine particles, a binder, a surfactant, and a thickener that is soluble in a solvent of a slurry used to form the porous protective film,
    wherein a weight ratio of the thickener to the fine particles in the porous protective film ranges from 0.10 to 0.20.

2. The electrode with a porous protective film according to claim 1, wherein the thickener comprises at least one type selected from the group consisting of hydroxyethyl cellulose, carboxymethyl cellulose, and polyethylene glycol.

3. The electrode with a porous protective film according to claim 1, wherein the surfactant comprises at least one type selected from the group consisting of sodium dodecyl sulfate, lithium dodecyl sulfate, and sodium hexametaphosphate.

4. The electrode with a porous protective film according to claim 1, wherein the fine particles comprises a metal oxide.

5. The electrode with a porous protective film according to claim 4, wherein the metal oxide comprises at least one type selected from the group consisting of alumina, titania, zirconia, and silica.

6. The electrode with a porous protective film according to claim 1, wherein the air permeability of the porous protective film is 3 to 600 sec/100 ml.

7. The electrode with a porous protective film according to claim 1, wherein a thickness of the porous protective film ranges from 0.1 μm to 200 μm.

8. The electrode with a porous protective film according to claim 1, wherein the binder contains a fluorine resin and a rubber resin, and the rubber resin comprises at least one type selected from the group consisting of styrene-butadiene rubber, acrylic rubber, and butadiene rubber.

9. A nonaqueous electrolyte secondary battery comprising:
    a negative electrode in which a negative electrode active material layer is disposed on a negative electrode collector;
    a positive electrode in which a positive electrode active material layer is disposed on a positive electrode collector;
    a nonaqueous electrolyte;
    a separator; and
    a porous protective film which is disposed on at least one of a surface of the negative electrode active material layer and a surface of the positive electrode active material layer and which contains fine particles, a binder, a surfactant, and a thickener that is soluble in a solvent of a slurry used to form the porous protective film,
    wherein a weight ratio of the thickener to the fine particles in the porous protective film ranges from 0.10 to 0.20.

10. The nonaqueous electrolyte secondary battery according to claim 9, wherein a thickness of the porous protective film ranges from 0.1 μm to 200 μm.

11. A method for manufacturing an electrode with a porous protective film, the method comprising the steps of:
preparing a porous protective film-forming slurry by mixing fine particles, a binder, a surfactant, a solvent, and a thickener that is soluble in the solvent; and
applying the porous protective film-forming slurry to an electrode, in which an active material layer is disposed on a collector, and
conducting drying to form the porous protective film,
wherein a weight ratio of the thickener to the fine particles in the porous protective film ranges from 0.10 to 0.20.

12. The method for manufacturing an electrode with a porous protective film according to claim 11, wherein a concentration of the thickener in the porous protective film-forming slurry is 0.50 to 1.0 percent by mass.

13. The method for manufacturing an electrode with a porous protective film according to claim 11, wherein a concentration of the surfactant in the porous protective film-forming slurry is 0.01 to 3.0 percent by mass.

14. The method for manufacturing an electrode with a porous protective film according to claim 11, wherein a thickness of the porous protective film ranges from 0.1 μm to 200 μm.

15. The method for manufacturing an electrode with a porous protective film according to claim 11, wherein a viscosity of the slurry ranges from 0.1 Pa·s to 3.5 Pa·s.

* * * * *